United States Patent [19]
Whitehead

[11] Patent Number: 5,311,496
[45] Date of Patent: May 10, 1994

[54] ACHROMATIC EXPANSION PRISM FOR MAGNETO-OPTICAL DRIVE

[75] Inventor: Frank R. Whitehead, Orangevale, Calif.

[73] Assignee: Hyundai Electronics America, San Jose, Calif.

[21] Appl. No.: 975,918

[22] Filed: Nov. 13, 1992

[51] Int. Cl.⁵ .............................................. G11B 7/00
[52] U.S. Cl. .................... 369/112; 369/44.32; 369/44.11; 359/834; 359/669
[58] Field of Search ............... 369/112, 44.32, 44.24, 369/44.11, 44.14; 359/834, 668, 833, 837; 350/421, 384

[56] References Cited

U.S. PATENT DOCUMENTS

| | | | |
|---|---|---|---|
| 4,016,504 | 4/1977 | Klauminzer | 331/94.5 |
| 4,368,957 | 1/1983 | Chirra | 350/469 |
| 4,451,913 | 5/1984 | Elliott | 369/110 |
| 4,514,047 | 3/1985 | Haskal et al. | 350/394 |
| 4,564,931 | 1/1986 | O'Hara et al. | 369/110 |
| 4,702,569 | 10/1987 | Mercado et al. | 350/479 |
| 4,704,008 | 11/1987 | Mercado | 350/420 |
| 4,734,905 | 3/1988 | Kuwayama et al. | 369/111 |
| 4,734,906 | 3/1988 | Baer et al. | 363/112 |
| 4,742,218 | 5/1988 | Nakamura et al. | 250/201 |
| 4,750,819 | 6/1988 | Sugiki | 359/669 |
| 4,761,064 | 8/1988 | Mercado et al. | 350/482 |
| 4,770,507 | 9/1988 | Arimoto et al. | 350/421 |
| 4,789,977 | 12/1988 | Oudenhuysen et al. | 369/109 |
| 4,799,210 | 1/1989 | Wilson et al. | 369/110 |
| 4,804,835 | 2/1989 | Ando | 250/201 |
| 4,828,371 | 5/1989 | McCaslin et al. | 350/421 |
| 5,013,136 | 5/1991 | Whitehead et al. | 359/669 |
| 5,018,804 | 5/1991 | Jung et al. | 350/3.71 |
| 5,151,890 | 9/1992 | Yonekubo | 369/112 |
| 5,155,633 | 10/1992 | Grove et al. | 359/834 |

Primary Examiner—Paul M. Dzierzynski
Assistant Examiner—Kim-Kwok Chu
Attorney, Agent, or Firm—Townsend and Townsend, Khourie and Crew

[57] ABSTRACT

The invention provides an achromatic expansion prism for use in magneto-optical disk drive systems. The achromatic expansion prism comprises a first prism having a first dispersion value, an entrance surface through which a light beam enters the first prism and an outlet surface through which the light beam exits the first prism, and a constant deviation prism fixed to the outlet surface of the first prism and having a second dispersion value. The constant deviation prism reflects the light beam in a first direction to the optical disk and reflects the light beam reflected from the optical disk in a second direction to a detector. The angle between the first and the second directions is constant irrespective of the angle of incidence of the light beam on the first prism. Moreover, the first and second dispersion values are selected such that the first and second directions are independent of wavelength of the light beam. The achromatic expansion prism thereby simplifies alignment of the prism for proper direction of the light beam toward the disk and detector, and has fewer components and compact size.

17 Claims, 2 Drawing Sheets

ACHROMATIC EXPANSION PRISM FOR MAGNETO-OPTICAL DRIVE

BACKGROUND OF THE INVENTION

The present invention relates generally to magneto-optical disk drives, and more specifically to prism systems including achromatizing, circularizing and beam-splitting prisms through which a light beam is transmitted in magneto-optical systems.

In a magneto-optical disk drive, a light beam, usually a laser beam, is directed to a surface of a magneto-optical disk and reflected therefrom to a detector. Information is recorded on the surface of the disk in the form of marks or spots magnetized in a particular direction. When the light beam is reflected from the marks, the polarization of the beam will be rotated according to the magnetization of the mark. This rotation in polarization causes the marks to appear either brighter on a dark background or dark on a brighter background, depending on the sense of rotation. The reflected light beam is directed to one or more detectors capable of sensing this relative brightness, thereby providing a digital signal. Magneto-optical systems are described in Marchant, *Optical Recording*, pp. 68–84 (Addison-Wesley, 1990) the complete disclosure of which is incorporated herein by reference.

Prisms are utilized in magneto-optical disk drive systems for several purposes. First, because many magneto-optical systems employ semiconductor lasers which produce an elliptical laser beam, an expansion prism is used to circularize the beam. By casting the laser beam at an acute angle of incidence on a surface of the expansion prism, the beam is expanded in the plane of incidence by refraction.

Second, prisms are used in magneto-optical systems to achromatize the light beam. Fluctuations in the power supplied to the laser can cause the wavelength of the light beam to change. Changes in wavelength can change the optical path of the light beam through a prism, thereby causing the beam to deviate from the intended path to the optical disk and detectors. Achromatization is commonly accomplished by passing the light beam through a complex prism consisting of two prisms attached to one another, the prisms having different refractive indices selected such that the output angle of the light beam is independent of changes in the wavelength of the light beam. Such an achromatizing prism is described in U.S. Pat. No. 4,770,507, the complete disclosure of which is incorporated herein by reference.

Third, beam-splitting prisms are commonly used in magneto-optical systems for directing a portion of the return beam reflected from the optical disk toward the detectors. Such beam splitters commonly comprise two glass prisms adjoined along a junction surface with a semi-transparent reflective film on the junction surface between the prisms. The junction surface is disposed at an angle relative to the direction of the light beam, and allows a portion of the light beam to pass through both prisms toward the magneto-optical disk, from which it is reflected back toward the reflective surface. A portion of the return beam is then reflected from the reflective surface to the detectors.

The use of such prisms for circularizing, achromatizing and splitting the light beam in magneto-optical disk drives has created certain problems. Primary among these is misalignment of the prisms, causing inaccurate positioning of the light beam on the optical disk and/or detectors. A slight change in the angle of a prism can cause the light beam to deviate from the intended optical path. The use of multiple, independent prisms to serve the functions of circularizing, achromatizing and beam-splitting intensifies the alignment problem. In addition, known systems require a undesirably large number of separately manufactured and installed parts, increasing system cost. Moreover, the use of multiple prisms increases the size of the system beyond that desired for small form-facto disk drives.

A prism system for a magneto-optical drive is therefore desired which will perform the circularizing, achromatizing and beam-splitting functions with improved alignability, fewer parts and compact size.

SUMMARY OF THE INVENTION

The invention provides an achromatic expansion prism for use in a magneto-optical disk drive which is more easily aligned so as to properly direct the light beam toward the optical disk and detectors. The prism further has fewer parts and more compact size then previous prism systems.

The achromatic expansion prism will be used in a magneto-optical disk drive wherein a light beam is directed toward an information-containing surface of an optical disk and reflected therefrom to a detector. In a preferred embodiment, the achromatic expansion prism comprises a first prism with a first dispersion value, the light beam being incident on an entrance surface of the first prism at a first angle and exiting the first prism through an outlet surface; and a constant deviation prism fixed to the outlet surface and having a second dispersion value, the constant deviation prism reflecting the light beam in a first direction to the optical disk, and further reflecting the light beam reflected from the optical disk in a second direction to the detector, wherein the angle between the first and second directions is constant irrespective of the first angle, and wherein the first and second dispersion values are selected such that the first and second directions are independent of the wavelength of the light beam. A variety of geometries may be employed, however, in a preferred embodiment, the constant deviation prism will reflect the light beam to the disk in a first direction and to the detectors in a second direction wherein the first and second directions are perpendicular to each other.

The first prism and the constant deviation prism will be joined at a junction surface coated with a semitransparent reflective film which permits a portion of the light beam to pass from one prism to the next while reflecting another portion of the beam. In this way, a portion of the light beam passing through the first prism will be reflected from the junction surface rather than entering the constant deviation prism. This reflected portion of light may be directed toward a power control detector coupled to a laser controller for controlling the power of the laser.

Light entering the constant deviation prism is directed toward and reflected from the optical disk, from which the light beam returns to the constant deviation prism and is reflected back to the junction surface. The semi-transparent reflective film reflects a portion of the light beam to the detectors for reading the information contained on the optical disk.

In a preferred embodiment, the constant deviation prism comprises a pentaprism having a transmitting surface through which the light beam passes to the optical disk and an exit surface through which the light beam passes to the detectors, wherein the transmitting surface and the exit surface are perpendicular. Preferably, the junction surface is adjacent the transmitting surface and disposed at a second angle relative thereto. A reflecting surface is disposed adjacent the exit surface for reflecting the light beam entering the constant deviation prism through the junction surface toward the optical disk, as well as for reflecting the light beam reflected from the optical disk back to the junction surface, from which the beam is reflected toward the detectors. The reflecting surface is disposed at a third angle relative to the exit surface. Preferably, the second and third angles are equal, and, in an exemplary embodiment, are 112.5°.

The achromatic expansion prism of the present invention thus provides achromatizing, circularizing and beam-splitting functions all in a single integrated structure. This structure is formed of only two components, as opposed to the four or more components comprising the prisms in prior art magneto-optical systems. Moreover, this integrated structure, along with the use of a constant deviation prism, greatly reduces the alignment problems of prior art systems. In addition, the expansion prism of the present invention is more compact than known multiple prism systems, making the expansion prism particularly suitable for small form-factor disk drives.

DESCRIPTION OF SPECIFIC EMBODIMENTS

The invention provides an achromatic expansion prism for use in a magneto-optical disk drive. In such disk drives, a light beam is directed to an information carrying surface of an optical disk and reflected therefrom to one or more detectors for reading the information according to the characteristics of the light beam reflected from the disk. In magneto-optical systems, a magnetic bias is applied to the disk by a coil held in close proximity to the disk and marks representing digital information are formed on the surface of the disk, each mark having a value of zero or one according to the polarity of magnetization. When the light beam is reflected from a mark, the magnetization of the mark rotates the polarization of the light beam, such that marks magnetized with one polarity appear brighter than marks magnetized with another polarity. This difference in brightness is sensed by the detectors which are connected to a processor for decoding the digital information.

Frequently, a solid state laser provides the light beam in magneto-optical systems. The light beam produced by a solid state laser is usually elliptical in shape, and therefore must be circularized before being directed at the surface of the optical disk. Moreover, fluctuations in power supplied to the laser will cause changes in the wavelength of the light beam, which can cause the light beam to deviate from the intended optical path to the disk and the detectors. Therefore, as described above, magneto-optical systems frequently employ prisms to circularize and achromatize the light beam before directing the beam at the optical disk.

Figure 1:
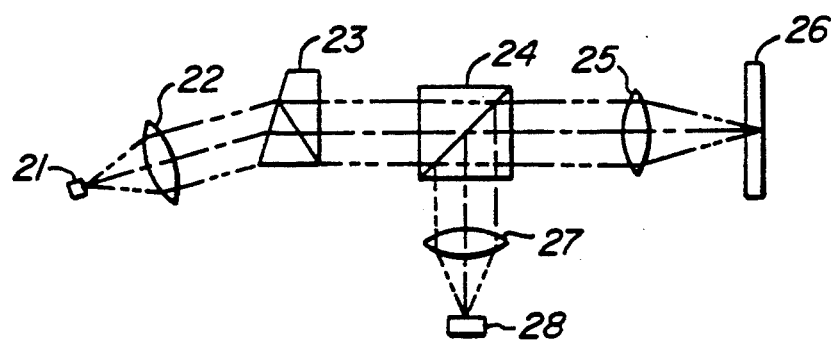
FIG. 1 is a schematic illustration of an optical prism system for an optical disk drive according to the prior art.

FIG. 1 illustrates an optical prism system for use in an optical disk drive according to U.S. Pat. No. 4,770,507, the complete disclosure of which is incorporated herein by reference. A laser light beam of elliptical shape in cross section is emitted from semiconductor laser 21 and is collimated by lens 22 to a parallel beam and introduced to complex prism 23. Complex prism 23 is comprised of two separate prism components each having a different dispersion of refractivity, so that the output beam exits prism 23 at an angle which remains constant irrespective of changes in wavelength of the laser light beam. The light beam is then directed to optical disk 26 through beam splitter 24 and lens 25. Light reflected from optical disk 26 returns through lens 25 into beam splitter 24. Beam splitter 24 includes a partially reflective surface disposed at an angle relative to the light beam such that a portion of the beam is reflected through lens 27 to photo detector 28. Thus, the prior art prism system of FIG. 1 serves to circularize, achromatize and split a light beam reflected from the surface of an optical disk by means of two separate prisms, with first prism 23 having two separate component prisms of different refractive dispersions, and second beam-splitting prism 24 having two components connected at a partially-reflective angular junction surface.

As described above, the system shown in FIG. 1 has suffered from certain problems, particularly in the alignment of prisms 23 and 24 so as to properly direct the light beam toward disk 26 and detector 28. A slight change in the incident angle of the light beam on prism 23 will cause the light beam to leave the prism in an improper direction, causing the system to fail or producing errors in reading or writing information on disk 26. Moreover, a change in the angle of beam splitter 24 relative to the light beam will misdirect the reflected beam away from lens 27 and/or detectors 28, again causing system failure or read/write errors. Thus, prisms 23 and 24 each must be carefully aligned such that the light beam is properly directed both at disk 26 and detectors 28.

Figure 2:
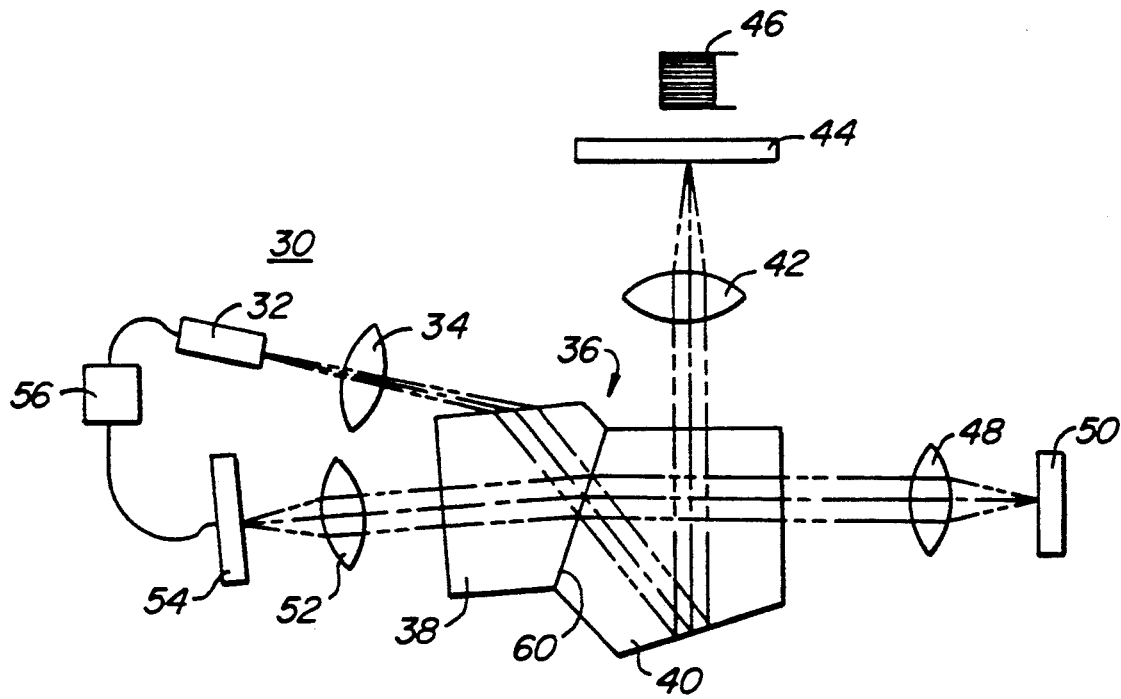
FIG. 2 is an optical system for a magneto-optical disk drive constructed in accordance with the principles of the present invention.

The present invention provides a prism system which greatly simplifies the alignment of the light beam so as to be properly focused on the optical disk and the detectors. Referring to FIG. 2, the magneto-optical system 30 of the present invention includes a solid state laser 32 which emits a light beam, typically of elliptical cross-section. The light beam passes through a collimating lens 34 and enters an achromatic expansion prism 36, which includes a first prism 38 fixed to a constant deviation prism 40. From expansion prism 36 the light beam is reflected through objective lens 42 to optical disk 44. A coil 46 is disposed over an opposing side of optical disk 44 for applying a magnetic biasing field to the disk. From optical disk 44 the light beam is reflected back through objective lens 42 and into constant deviation prism 40 of the expansion prism 36. The beam is reflected to a detector 50 through a lens 48. For laser power control, a portion of the light beam entering expansion prism 36 from laser 32 is reflected back out of the first prism 38 through lens 52 to a power control detector 54. Power control detector 54 is coupled to a laser power controller 56 which, by monitoring the amount of light reflected to detector 54, controls the power supplied to laser 32.

Figure 3:
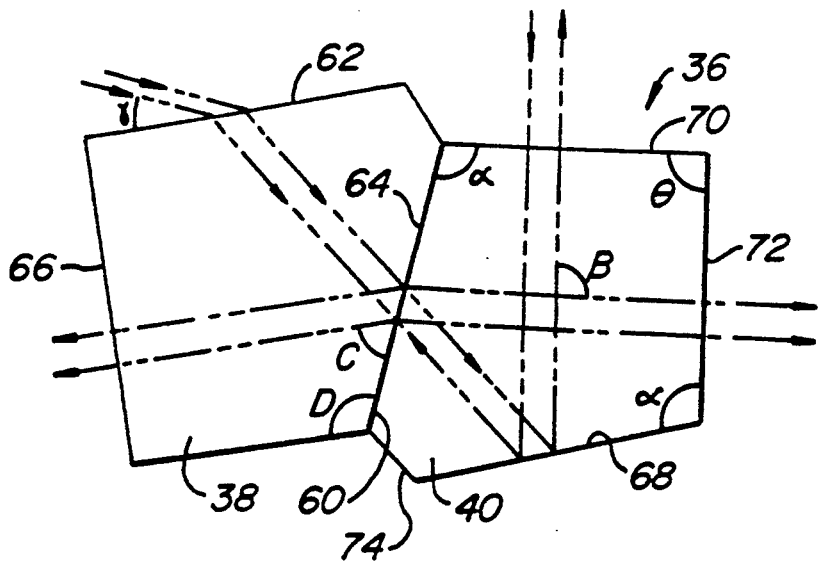
FIG. 3 is a front view of an achromatic expansion prism constructed in accordance with the principles of the present invention.
Figure 3A:
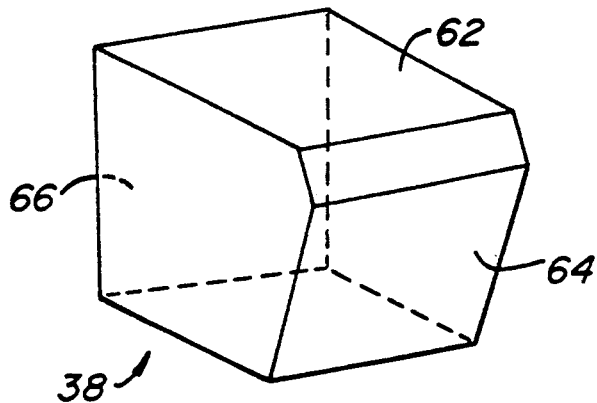
FIG. 3A is a perspective view of a first prism of the expansion prism of FIG. 3

Referring now to FIG. 3, expansion prism 36 will be more fully described. Expansion prism 36 includes a first prism 38 fixed to a constant deviation prism 40 along a junction surface 60. Prisms 38 and 40 will be constructed of optical quality glass. Prism 38 has a dispersion value (dispersion of refractivity) which is different than that of constant deviation prism 40. These dispersion values are selected such that the direction in which the light beam exits constant deviation prism 40 will be constant irrespective of the wavelength of the light beam. Techniques for selecting the proper dispersion values so as to result in achromatic light output are discussed in U.S. Pat. No. 4,770,507 which has been incorporated herein by reference. Preferably, first prism 38 will be of low dispersion glass with an Abbe constant greater than 55, while constant deviation prism 40 will be of high dispersion glass with Abbe constant less than 40.

The light beam enters first prism 38 through an entrance surface 62 at an angle of incidence $\gamma$. $\gamma$ will preferably be chosen so as to expand the elliptical beam in one axis so as to circularize the beam. Typically, $\gamma$ will be in the range of 65° to 75°. The light beam passes through first prism 38 to an outlet surface 64 which is fixed to junction surface 60 of constant deviation prism 40. Junction surface 60 will be coated with a semitransparent reflective film which reflects a portion of the light beam through a second outlet surface of first prism 38 toward laser power control detectors 54 (FIG. 2). In an exemplary embodiment, the semitransparent reflective film will be a multiple-layer dielectric coating. In a preferred embodiment, approximately 20% of the light beam is reflected out of second outlet surface 66 for laser power control purposes.

The remaining portion of the light beam not reflected by the reflective junction surface passes through outlet surface 64 and junction surface 60 into constant deviation prism 40. The light beam is directed toward a reflecting surface 68, which is coated with a reflective layer, which usually will comprise a multiple-layer dielectric coating. The light beam is reflected from a reflecting surface 68 in a first direction toward objective lens 42 and optical disk 44, as shown in FIG. 2. The light beam exits constant deviation prism 40 through a transmitting surface 70.

The light beam reflected from the optical disk returns to the constant deviation prism 40 aligned with the first direction and is reflected again from reflecting surface 68 to junction surface 60. The semitransparent reflective coating on junction surface 60 reflects the light beam toward the detectors 50 (FIG. 2) for purposes of reading the information contained on the optical disk. The light beam exits constant deviation prism 40 through an exit surface 72 and passes to the detectors in the second direction.

Figure 3B:
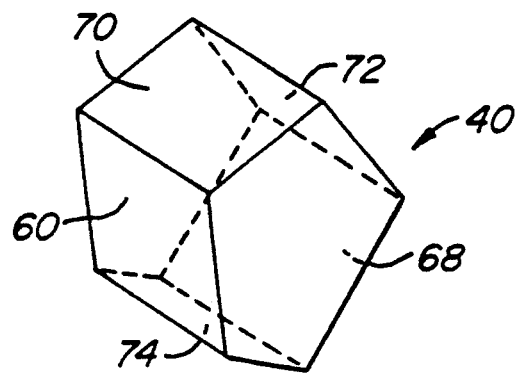
FIG. 3B is a perspective view of the constant deviation prism in the expansion prism of FIG. 3.

Constant deviation prism 40 will be configured to reflect the light beam in such a way that the angel $\beta$ between the first and second directions is constant regardless of the angle at which the light beam enters the prism. In a specific embodiment, the angle $\alpha$ between transmitting surface 70 and junction surface 60 will be equal to the angle between exit surface 72 and reflecting surface 68. In a preferred embodiment the first and second directions will be perpendicular ($\beta = 90°$). In this embodiment the angle $\theta$ between transmitting surface 70 and exit surface 72 will also be 90°, and angle $\alpha$ between the transmitting surface 70 and junction surface 60 will be 112.5°, as will the angle between the exit surface 72 and reflecting surface 68. While junction surface 60 and reflecting surface 68 could extend to their point of intersection, such a configuration may form a brittle edge subject to damage, which can be eliminated by forming a fifth side 74 on constant deviation prism 40 disposed between junction surface 60 and reflecting surface 68. Constant deviation prism 40 is therefore pentagonal in shape (a pentaprism), as illustrated in FIG. 3B. It should be understood that the angle $\beta$ between the first and second directions may be selected from a variety of angles by selecting a constant deviation prism having a geometry appropriate for the particular configuration of the magneto-optical system.

First prism 38 is configured to provide the proper angle of incident $\gamma$ of the light beam on entrance surface 62 to achieve circularization, and the proper angle of reflection C from outlet surface 64 to laser power control detectors 54 through second outlet surface 66. Angle of incidence $\gamma$ will usually be between 65 and 75. In an exemplary embodiment, outlet surface 64 will be disposed at an angle D relative to entrance surface 62 between 60° and 70°. Outlet surface 64 of first prism 38 will be fixed to junction surface 60 of constant deviation prism 40 by means of adhesive or other known bonding technique.

In order to align the prism, it is positioned so that the light beam is properly directed either toward objective lens 42 and optical disk 44, or toward objective lens 48 and detector 50. Once the light beam is properly aligned in either the first or second direction, the beam will be automatically in alignment in the other direction, since the angle between the first and second directions is always constant. Centering and alignment of the collimated beam from lens 34 to entrance surface 62 of prism 38 at angle $\gamma$ then completes the optical alignment. Advantageously, because achromatizing and circularizing are performed by the same prism which performs the beam-splitting function, separate alignment of multiple prisms is not required. Moreover, because the beam is achromatized as it passes through the expansion prism, the beam will always be properly aligned upon exiting the constant deviation prism regardless of the wavelength of the light beam. The light beam will be circularized, achromatized, and properly directed to both the optical disk and the detectors by passing only through a single, integrated compact prism having only two prism components.

The present invention thus provides a prism system for use in a magneto-optical disk drive which greatly reduces the alignment problems found in prior art systems, has fewer components for improved manufacturability and lower cost, and compact size suitable for small form-factor optical disk drives.

While the above is a complete description of the preferred embodiments of the invention, various alternative, modifications, and equivalents may be used. Therefore, the above description should not be taken as limiting the invention which is defined by the appended claims.

What is claimed is:

1. An achromatic expansion prism in an optical disk drive wherein a light beam emitted from a light source is directed toward an information-containing surface of an optical disk and reflected therefrom to a detector, the achromatic expansion prism comprising:

a first prism with a first dispersion value, the light beam being incident on an entrance surface of the first prism at a first angle and exiting the first prism through an outlet surface; and a constant deviation prism fixed to the outlet surface and having a second dispersion value, the constant deviation prism receiving the light beam through the outlet surface, and reflecting the light beam in a first direction to the optical disk, and further reflecting the light beam reflected from the optical disk in a second direction to the detector, the constant deviation prism employing a plurality of surfaces thereof to effect the reflecting, wherein the angle between the first and second directions is constant irrespective of the first angle, and wherein the first and second dispersion values are selected such that the first and second directions are independent of wavelength of the light beam.

2. The achromatic expansion prism of claim 1 wherein the constant deviation prism includes:

a junction surface fixed to the outlet surface through which the light beam from the first prism is transmitted, the junction surface being coated with a semi-transparent reflective film for reflecting a portion of the light beam;

a reflecting surface for reflecting the light beam entering the constant deviation prism in said first direction;

a transmitting surface through which the light beam is transmitted from the reflecting surface to the optical disk; and an exit surface through which the light beam reflected from the optical disk is transmitted in said second direction to the detector.

3. An achromatic expansion prism as in claim 2 wherein the light beam reflected from the optical disk enters the constant deviation prism through the transmitting surface and is reflected by the reflecting surface to the reflecting film on the junction surface, which partially reflects the light beam through the exit surface to the detector.

4. An achromatic expansion prism as in claim 2 wherein the first prism includes a second outlet surface, a portion of the light beam being reflected by the reflective film on the junction surface through the second outlet surface to a light power control detector.

5. An achromatic expansion prism as in claim 1 wherein the transmitting surface adjoins the junction surface at a second angle, and the exit surface adjoins the reflecting surface at a third angle, the second and third angles being equal.

6. An achromatic expansion prism in an optical disk drive wherein a light beam emitted from a light source is directed toward an information-containing surface of an optical disk and reflected therefrom to a detector, the prism comprising:

a first prism with a first dispersion value, the light beam being incident on an entrance surface of the first prism at a first angle and exiting the first prism through an outlet surface; and a constant deviation prism fixed to the outlet surface and having a second dispersion value, the constant deviation prism including:

a junction surface fixed to the outlet surface through which the light beam from the first prism is transmitted, the junction surface being coated with a semi-transparent reflective film for reflecting a portion of the light beam;

a reflecting surface for reflecting the light beam entering the constant deviation prism toward the optical disk;

a transmitting surface through which the light beam is transmitted from the reflecting surface to the optical disk in a first direction; and an exit surface through which the light beam reflected from the optical disk is transmitted to the detector in a second direction;

wherein the angle between the first and second directions is constant irrespective of the first angle, and wherein the first and second dispersion values are selected such that the first and second directions are independent of wavelength of the light beam.

7. An achromatic expansion prism as in claim 6 wherein the light beam reflected from the optical disk enters the constant deviation prism through the transmitting surface and is reflected by the reflecting surface to the reflective film on the junction surface, which partially reflects the light beam through the exit surface to the detector.

8. An achromatic expansion prism as in claim 6 wherein the first prism includes a second outlet surface, a portion of the light beam being reflected by the reflective film on the junction surface through the second outlet surface to a power control detector.

9. An achromatic expansion prism as in claim 6 wherein the transmitting surface adjoins the junction surface at a second angle and the exit surface adjoins the reflecting surface at a third angle, the second and third angles being equal.

10. An achromatic expansion prism as in claim 9 wherein the first and second directions are perpendicular.

11. An achromatic expansion prism as in claim 10 wherein the second and third angles are 112.5°.

12. An achromatic expansion prism as in claim 6 wherein the light beam is elliptical prior to entering the first prism, the first angle being selected so as to circularize the light beam.

13. An achromatic expansion prism as in claim 6 wherein the first prism has an Abbe constant greater than 55, and the second prism has an Abbe constant less than 40.

14. An optical system for a magneto-optical disk drive for reading and writing information on a magneto-optical disk, the optical system comprising:

a laser producing a light beam for reflecting on a surface of the disk;

a detector for detecting the light beam reflected from the disk; and an achromatic expansion prism disposed between the laser and the disk, the achromatic expansion prism comprising:

a first prism with a first dispersion value, the light beam being incident from the laser on an entrance surface of the first prism at a first angle and exiting the first prism through an outlet surface; and a constant deviation prism fixed to the outlet surface and having a second dispersion value, the constant deviation prism receiving the light beam through the outlet surface, and reflecting the light beam in a first direction toward the disk and further reflecting the light beam in a second direction to the detector, the constant deviation prism employing a plurality of surfaces thereof to effect the reflecting, wherein the angle between the first and second directions is constant irrespective of the first angle, and wherein the first and second dispersion values are selected such that the first and second directions are independent of wavelength of the light beam.

15. An optical system as in claim 14 wherein the laser produces a light beam of elliptical cross-section, the first angle being selected so as to circularize the light beam.

16. An optical system as in claim 14 further comprising:

a controller coupled to the laser for controlling power supplied to the laser; and a power control detector coupled to the controller, wherein a portion of the light beam is reflected by the first prism to the power control detector, the controller controlling power to the laser according to the amount of light detected by the power control detector.

17. An optical system as in claim 14 wherein the first prism has an Abbe constant greater than 55 and the second prism has an Abbe constant less than 40.

* * * * *